United States Patent [19]

Pariani

[11] Patent Number: 4,538,961
[45] Date of Patent: Sep. 3, 1985

[54] DEVICE FOR CONTROLLING CYCLIC AND COLLECTIVE PITCH OF A HELICOPTER ROTOR

[75] Inventor: Emilio Pariani, Cardano al Campo, Italy

[73] Assignee: Costruzioni Aeronautiche Giovanni Agusta S.p.A., Italy

[21] Appl. No.: 503,852

[22] Filed: Jun. 13, 1983

[30] Foreign Application Priority Data

Jun. 18, 1982 [IT] Italy .................. 67779 A/82

[51] Int. Cl.³ ............................................ B64C 27/74
[52] U.S. Cl. .................................... 416/114; 416/140; 416/162
[58] Field of Search ............... 416/114, 98, 112, 113, 416/115, 116, 117, 140 A, 162

[56] References Cited

U.S. PATENT DOCUMENTS

| 2,439,089 | 4/1948 | Hodson | 416/114 |
| 2,487,953 | 11/1949 | Sznycer | 74/60 |
| 2,530,276 | 11/1950 | Weir | 416/114 X |
| 2,689,616 | 9/1954 | Nagler | 416/114 |
| 2,861,640 | 11/1958 | Du Pont | 416/114 X |
| 2,978,037 | 4/1961 | Focke | 416/114 X |
| 3,288,227 | 11/1966 | Derschmidt | 416/114 |
| 3,322,200 | 5/1967 | Tresch | 416/112 |
| 3,508,841 | 4/1970 | Derschmidt | 416/114 X |
| 3,545,880 | 12/1970 | Mouille | 416/114 |
| 3,764,229 | 10/1973 | Ferris et al. | 416/114 |

FOREIGN PATENT DOCUMENTS

| 555690 | 4/1958 | Canada | 416/114 |
| 713358 | 8/1954 | United Kingdom | 416/114 |
| 1458835 | 11/1976 | United Kingdom | 416/114 |

Primary Examiner—Everette A. Powell, Jr.
Attorney, Agent, or Firm—Kane, Dalsimer, Kane, Sullivan and Kurucz

[57] ABSTRACT

A device for controlling the cyclic and collective pitch of a helicopter rotor in which a fixed ring of an oscillating plate is maintained regularly fixed and is guided in its oscillations with respect to a drive shaft by a plurality of variable configuration supports uniformly distributed about the said drive shaft and connected to the said fixed ring by means of cylindrical pivots at least one of which is eccentric with respect to an axis rotation of an associated supported fork, which is perpendicular thereto.

5 Claims, 3 Drawing Figures

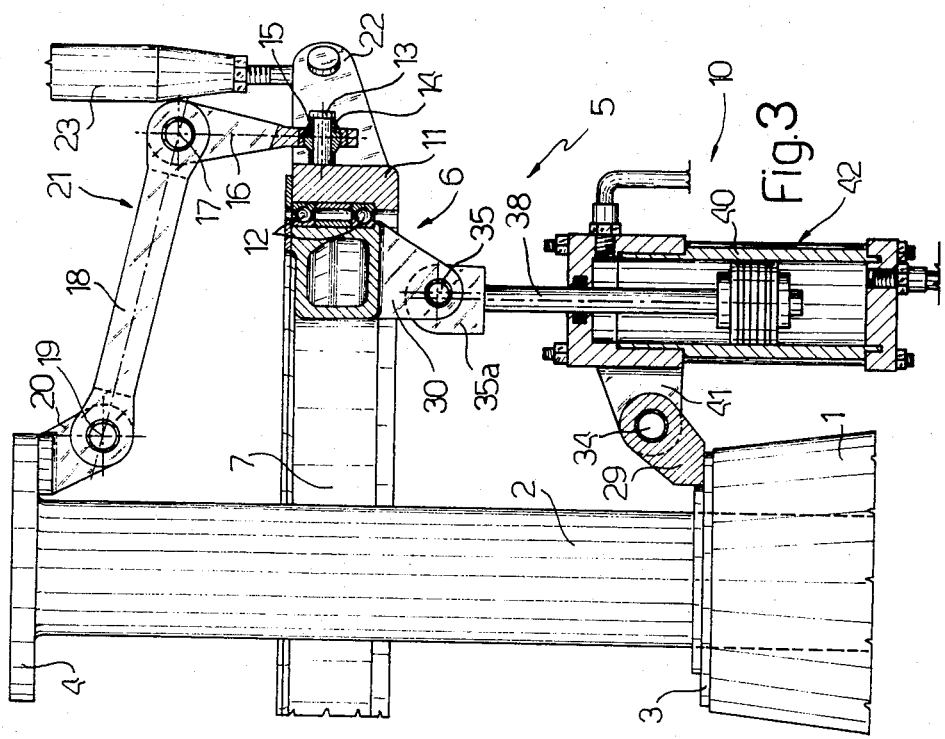
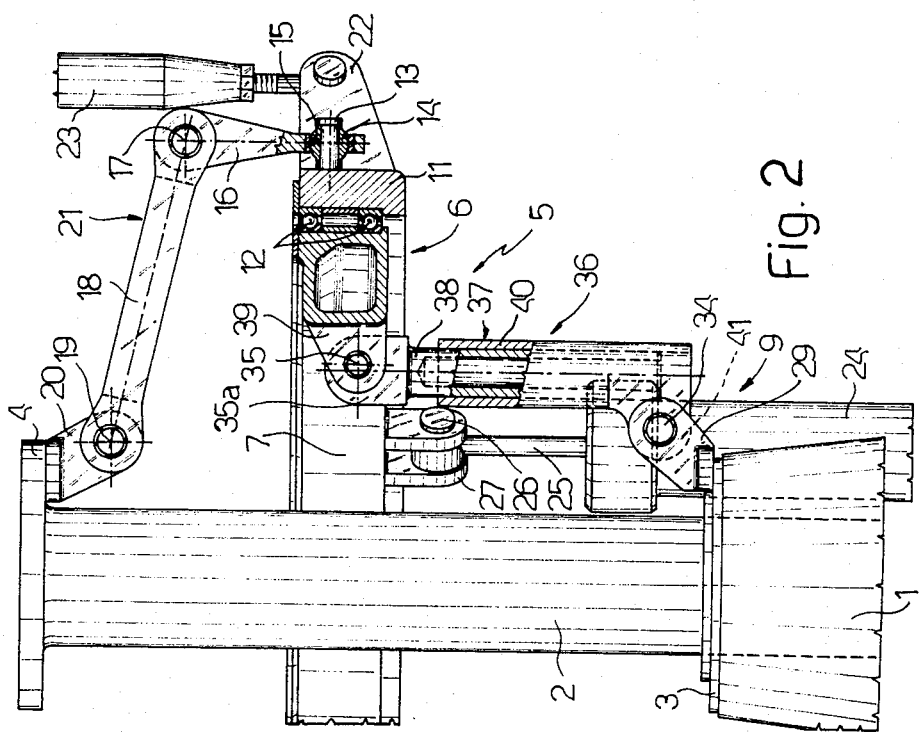

DEVICE FOR CONTROLLING CYCLIC AND COLLECTIVE PITCH OF A HELICOPTER ROTOR

BACKGROUND OF THE INVENTION

The present invention relates to a control device for controlling the cyclic and collective pitch of a helicopter rotor.

In known helicopter rotors the cyclic and collective pitches are normally controlled by means of an oscillating plate control device including two concentric rings the outer of which is rotatably supported by the inner and is drivingly connected to a drive shaft to carry into rotation the pitch changing rods each pivoted in an eccentric position to an associated blade.

In the above described known rotors the side inner ring is mounted on a ball-joint through which the drive shaft passes and which is supported by a pylon which is angularly fixed and axially movable, and can oscillate about the centre of the said ball-joint under the thrust of a plurality of fixed fluid pressure actuators uniformly distributed about the drive shaft.

The known cyclic and collective pitch control device described above has, in general, various disadvantages deriving both from the complexity of its component parts and from the extremely high precision required correctly to couple these together, and from the high rigidity conferred on the whole oscillating plate by the direct coupling between the fixed ring thereof and the said fixed pylon.

SUMMARY OF THE INVENTION

The object of the present invention is that of providing a cyclic and collective pitch control device which will be of simple design and construction, comprise a reduced number of parts, and allow the plate to oscillate freely with respect to the drive shaft without being centrally tied to it.

The said object is achieved by the present invention in that it relates to a cyclic and collective pitch control device for a helicopter rotor, the device comprising an oscillating plate mounted about a drive shaft to oscillate with respect to this latter about axes substantially perpendicular thereto; the said oscillating plate including an angularly fixed inner ring and an outer ring mounted rotatably on the said inner ring to rotate with the said drive shaft and oscillate with the said inner ring under the thrust of support and displacement means of this latter about the said axes, characterised by the fact that the said support means comprises a plurality of supports having a variable configuration uniformly distributed about the said drive shaft and extending between a fixed support and the said inner ring; the said variable configuration supports being connected to the said inner ring by cylindrical pivots perpendicular to the said drive shaft and supported by respective forks rotatable about their axes perpendicular to the axis of the associated cylindrical pivot, and at least one of these latter being eccentric with respect to the axis of rotation of the associated fork.

BRIEF DESCRIPTION OF THE DRAWINGS

Further characteristics and advantages of the present invention will become apparent from the following description with reference to the attached drawings, which illustrate various non limitative embodiments thereof; in which:

FIGS. 2 and 3 are similar to FIG. 1 and relate to a second and a third embodiment respectively of the control device according to the invention.

DETAILED DESCRIPTION OF THE INVENTION

Figure 1:
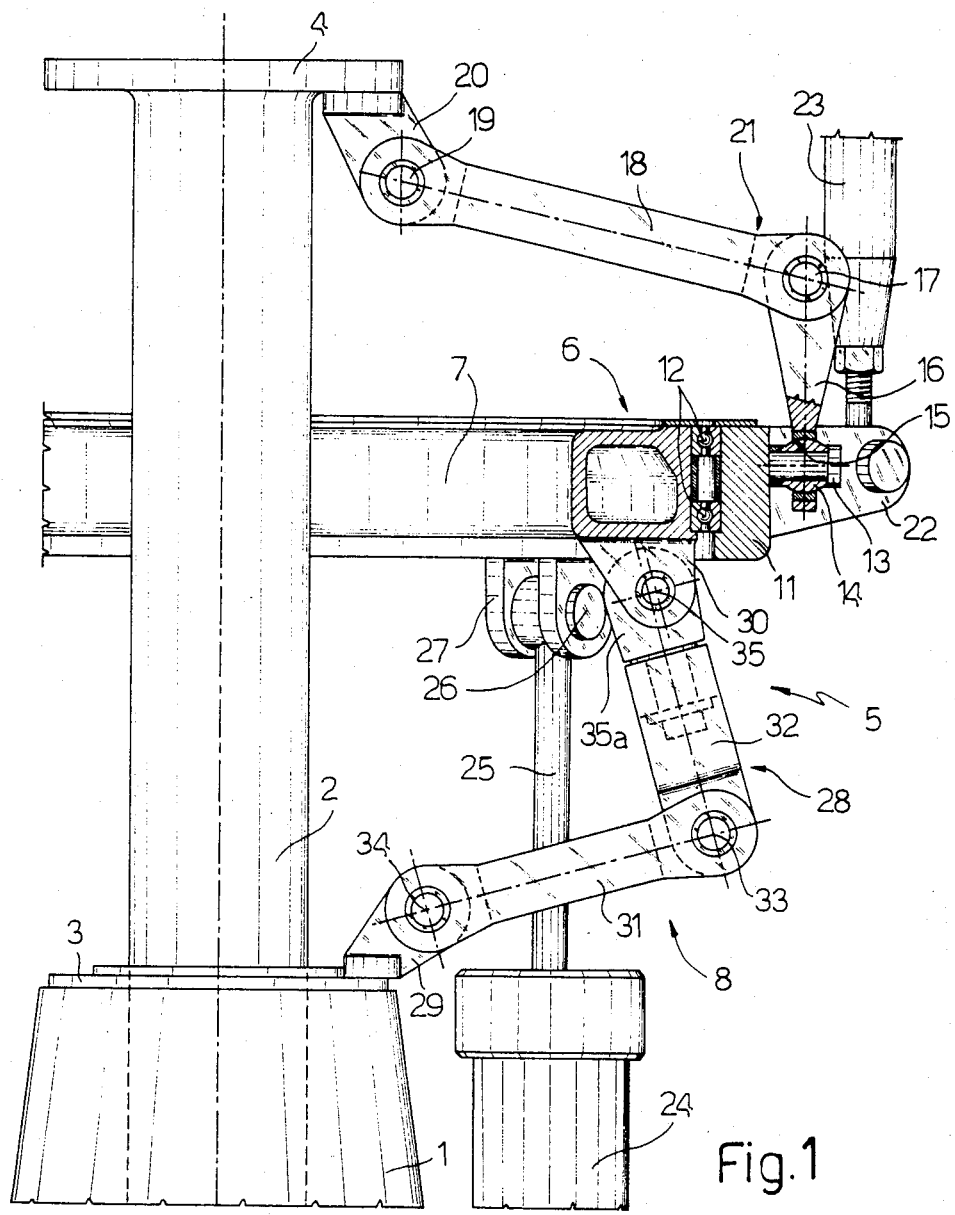
FIG. 1 is a schematic and partly sectioned side view of a first embodiment of the cyclic and collective pitch control device according to the present invention.

In FIG. 1 there is illustrated a fixed hollow pylon 1 for a helicopter rotor (not illustrated), which is traversed by a substantially vertical drive shaft 2 the upper end of which extends above an annular upper end plate 3 of the fixed pylon 1 and terminates at the top with an attachment flange 4 for the said rotor (not illustrated).

Around the pylon 1 and the drive shaft 2 there is disposed a cyclic and collective pitch control device generally indicated 5 and including an oscillating plate 6 of annular form extending around the part of the drive shaft 2 projecting above the plate 3.

The oscillating plate 6 includes an inner fixed ring 7 non-rotatably linked to the pylon 1 by means of a support and attachment device generally indicated 8 in FIG. 1 and, respectively 9 and 10 in FIGS. 2 and 3, and a rotatable ring 11 coupled in a rotatable manner to an outer cylindrical surface of the fixed ring 7 by means of the interposition of bearings 12.

From the outer surface of the rotatable ring 11 there extend, outwardly, three fixed pins 13 uniformly distributed and each supporting a respective ball-joint 14 housed in a spherical seat 15 formed on one end of a respective link 16. This latter is pivoted at its other end, by means of a cylindrical pivot 17 the axis of which is perpendicular to that of the drive shaft 2, to one end of an associated second link 18 and other end of which is pivoted, by means of a further cylindrical pivot 19, the axis of which is parallel to that of the pivot 17, to a respective bracket 20 extending outwardly and downwardly from the flange 4.

The links 16 and 18 constitute three uniformly distributed transmission torque links 21 the function of which is to transmit the rotary movement from the drive shaft 2 to the rotatable ring 11. Three brackets 22, uniformly distributed, extend outwardly from the outer surface of the rotatable ring 11 and to each of these brackets is pivoted the lower end of a pitch control rod 23 the upper end of which (not illustrated) is eccentrically connected to an associated blade (not illustrated).

As illustrated in FIG. 1, the support and attachment device 8, the function of which is that of securely interconnecting the ring 7 with the pylon 1 and of varying its attitude with respect to the axis of the drive shaft 2 in such a way as to vary the collective pitch and/or the cyclic pitch of the blades, includes three substantially vertical hydraulic actuators 24 uniformly distributed about the pylon 1 and each provided with an output shaft 25 the free end of which is pivoted to the lower surface of the fixed ring 7 by means of an associated pin 26 and fork 27.

The device 8 further includes three torque links 28 uniformly distributed about the drive shaft 2 and interposed between an associated bracket 29 rigidly connected to the plate 3 of the pylon 1 and an associated bracket 30 rigidly connected to the lower surface of the ring 7. Each torque link 28 comprises two links 31 and 32 pivotally connected together by means of a cylindrical pivot 33 and the first of which is pivoted to the associated bracket 29 by means of a cylindrical pivot 34 and the second of which is pivoted to the associated bracket 30 by means of a cylindrical pivot 35 formed by a fork 35a rotatable about the axis of the link 32.

The support and attachment device 9 of the embodiment illustrated in FIG. 2 differs from the device 8 of the FIG. 1 embodiment only by the fact that the torque links 28 of the FIG. 1 embodiment are replaced with torque links 36 each comprising a single link 37 of variable length comprising a shaft 38 pivoted, by means of a pivot 35, to an associated bracket 39 extending radially inwardly from the inner surface of the ring 7. Each shaft 38 is slidably mounted within a guide sleeve 40 provided with a lower radial bracket 41 pivotally connected at 34 to the associated bracket 29. In this case, too, each pivot 35 is formed by means of a fork 35a rotatable with the shaft 38 about the axis of the associated sleeve 10.

The support and attachment device 10 of the embodiment illustrated in FIG. 3 differs from the device 9 of FIG. 2 only by the fact that in this the hydraulic actuators 24 are eliminated and replaced by hydraulic actuators 42 the body of each of which is constituted by a tubular body mounted like the sleeve 40, and the output shaft of each of which corresponds to one of the shafts 38 and is pivoted to the ring 7 by means of a pivot 35 constituted by a fork 35a rotatable with the associated shaft 38 about the axis of the associated actuator 42. In other words, the hydraulic actuators 42 each constituted a link similar to the links 37 the length of which is directly variable and not indirectly via the actuators 24 as in the device 9 of FIG. 2.

As illustrated in the drawings, the principle characteristic, from the functional point of view, common to the devices 8, 9, and 10 is constituted by the fact that at least one of the pivots 35 is eccentric with respect to the axis of rotation perpendicular to it, of the associated fork 32a.

The above described structural characteristic permits the disc 7 to perform slight transverse displacements about the said eccentric pivot 35 in such a way as to avoid dangerous sticking which could occur during the variation in the attitude of the oscillating plate 6 due to the fact that this latter, not being guided as was generally the case in known rotors, by a ball-joint diametrally transversed by the drive shaft, can turn about instantaneous axes perpendicular to the axis of the drive shaft 2 but skew with respect thereto.

I claim:

1. A cyclic and collective pitch control device for a helicopter rotor mounted on a drive shaft, said control device being supported by a fixed support and comprising:

an oscillating plate mounted around and spaced away from said drive shaft, said plate including a fixed inner ring and an outer ring rotatably mounted on said inner ring, said outer ring being adapted to rotate with said drive shaft;

a plurality of variable configuration supports uniformly distributed around said drive shaft and extending between said fixed support and the inner ring;

each of said configuration supports including a cylindrical pivot perpendicular to said drive shaft for connecting said configuration support to said plate, and forks engaging said pivot and being rotatable about a fork axis perpendicular to the axis of the associated pivot, at least one of said pivots being eccentric;

displacement means attached to said plate and adapted to oscillate said plate with respect to said shaft about axis substantially perpendicular thereto; and rotor blade control means connected to said outer ring.

2. A device according to claim 1, characterised by the fact that each said variable configuration support includes a torque link (28) constituted by two links (31,32) one of which carries at its end the associated said rotatable fork (35a).

3. A device according to claim 1, characterised by the fact that each said variable configuration support (36) comprises a rod (38) carrying at its end the said fork (35a) and axially slidably mounted for displacement along a guide sleeve (40) pivoted to the said fixed support (1).

4. A device according to claim 1, characterised by the fact that each said variable configuration support includes an hydraulic actuator (42) pivoted on the said fixed support (1) and having an output shaft (38) carrying the said fork (35a) at its end.

5. The control device of claim 1 wherein the fork axis corresponding to said eccentric pivot does not intersect the associated pivot axis.

* * * * *